(12) United States Patent
Villar Piqué

(10) Patent No.: US 10,263,513 B2
(45) Date of Patent: Apr. 16, 2019

(54) SWITCHED CAPACITOR POWER CONVERTER

(71) Applicant: NXP B.V., Eindhoven (NL)

(72) Inventor: Gerard Villar Piqué, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/917,326

(22) Filed: Mar. 9, 2018

(65) Prior Publication Data
US 2018/0316262 A1 Nov. 1, 2018

(30) Foreign Application Priority Data

Apr. 28, 2017 (EP) ..................................... 17168832

(51) Int. Cl.
*H02M 3/07* (2006.01)
*H02M 1/08* (2006.01)
*H02M 1/00* (2006.01)

(52) U.S. Cl.
CPC .............. *H02M 3/07* (2013.01); *H02M 1/08* (2013.01); *H02M 2001/0054* (2013.01); *H02M 2003/071* (2013.01); *H02M 2003/072* (2013.01)

(58) Field of Classification Search
CPC ........................ H02M 2003/0072; H02M 3/07
See application file for complete search history.

(56) References Cited

U.S. PATENT DOCUMENTS

| | | | |
|---|---|---|---|
| 2002/0089313 A1* | 7/2002 | Shashoua | H02M 3/07 323/209 |
| 2011/0128762 A1* | 6/2011 | Ripley | H02M 3/07 363/62 |
| 2014/0043010 A1* | 2/2014 | Salem | H02M 3/1584 323/311 |
| 2015/0022169 A1 | 1/2015 | Cannankurichi Vijaya Mohan et al. | |
| 2016/0062378 A1* | 3/2016 | Ruiz | H02M 3/07 323/268 |
| 2017/0063222 A1* | 3/2017 | Teh | H02M 3/07 |

FOREIGN PATENT DOCUMENTS

| | | |
|---|---|---|
| JP | 4231992 B2 | 3/2009 |
| WO | 2009/067591 A2 | 5/2009 |

* cited by examiner

*Primary Examiner* — Harry R Behm
(74) *Attorney, Agent, or Firm* — Rajeev Madnawat

(57) ABSTRACT

A switched capacitor power converter comprising: an input terminal; an output terminal; a plurality of capacitors; a plurality of switches for selectively connecting the plurality of capacitors to each other, and/or to the input terminal, and/or to the output terminal; and a controller configured to operate the plurality of switches based on an output voltage, such that one or more of the plurality capacitors are connected between the input terminal and the output terminal as either: a first-topology, to provide a first conversion ratio; or a second-topology, to provide a second conversion ratio, wherein the second conversion ratio is different to the first conversion ratio.

15 Claims, 5 Drawing Sheets

M=1/2

M=1/3

SWITCHED CAPACITOR POWER CONVERTER

CROSS-REFERENCE TO RELATED APPLICATIONS

This application claims the priority under 35 U.S.C. § 119 of European Patent application no. 17168832.8, filed on Apr. 28, 2017, the contents of which are incorporated by reference herein.

The present disclosure relates to switched capacitor power converters and methods for operating switched capacitor power converters.

According to a first aspect of the present disclosure there is provided a switched capacitor power converter comprising: an input terminal; an output terminal; a plurality of capacitors; a plurality of switches for selectively connecting the plurality of capacitors to each other, and/or to the input terminal, and/or to the output terminal, and/or a reference terminal; and a controller configured to operate the plurality of switches based on the output voltage, such that one or more of the plurality capacitors are connected between the input terminal and the output terminal as either: a first-topology, to provide a first conversion ratio; or a second-topology, to provide a second conversion ratio, wherein the second conversion ratio is different to the first conversion ratio.

In one or more embodiments, the controller may be configured to operate the plurality of switches based on a comparison between the output voltage and a predetermined-threshold-voltage-condition.

In one or more embodiments, the switched capacitor power converter further comprises a reference terminal. The input terminal may be configured to receive an input voltage. The output terminal may be configured to provide an output voltage. Each of the plurality of capacitors may comprises a first plate and a second plate. The controller may be coupled to: the plurality of switches; and the voltage output terminal. The controller may comprise a clock-signal-input-terminal, configured to receive a clock-signal, having a first-phase and a second-phase. The controller may be configured to compare the output voltage with a predetermined-threshold-voltage-condition.

In one or more embodiments, if the output voltage satisfies the predetermined-threshold-voltage-condition, then the controller may: configure a first-selected-set of the plurality of switches according to a first-input-topology during the first-phase, such that the first plate of each of a first-selected-set of the plurality of capacitors is coupled to the voltage input terminal, and the second plate of each of the first-selected-set of the plurality of capacitors is coupled to the output terminal; and configure the first-selected-set of the plurality of switches according to a first-output-topology during the second-phase, such that the first plate of each of a first-selected-set of the plurality of capacitors is coupled to the voltage output terminal, and the second plate of each of the first-selected-set of the plurality of capacitors is coupled to the reference terminal.

In one or more embodiments, if the output voltage does not satisfy the predetermined-threshold-voltage-condition, then the controller may: configure a second-selected-set of the plurality of switches according to a second-input-topology during the first-phase, such that the first plate of each of a second-selected-set of the plurality of capacitors is coupled to the voltage input terminal, and the second plate of each of the second-selected-set of the plurality of capacitors is coupled to the output terminal; and configure the second-selected-set of the plurality of switches according to a second-output-topology during the second-phase, such that the first plate of each of a second-selected-set of the plurality of capacitors is coupled to the voltage output terminal, and the second plate of each of the second-selected-set of the plurality of capacitors is coupled to the reference terminal.

In one or more embodiments, the first-input-topology may be different to the second-input-topology, and the first-output-topology may be different to the second-output-topology.

In one or more embodiments, the first-input-topology and the first-output-topology may be configured to provide the output voltage at a first-output-voltage-value that is based on a product of a first-ratio-value with the input voltage; and the second-input-topology and the second-output-topology may be configured to provide the output voltage at a second-output-voltage-value that is based on a product of a second-ratio-value with the input voltage, wherein the first-ratio-value is different to the second-ratio-value.

In one or more embodiments, the second-input-topology and the second-output-topology may be selected such that a difference between the first-ratio-value and the second-ratio-value is less than a predetermined-ratio-value.

In one or more embodiments, the controller may be configured to set the predetermined-ratio-value based on one or more of: the predetermined-threshold-voltage-condition; and the input voltage.

In one or more embodiments, the predetermined-threshold-voltage-condition may comprise an upper-voltage-value and a lower-voltage-value; and the controller may be configured to set the predetermined-ratio-value based on the upper-voltage-value and the lower-voltage-value.

In one or more embodiments, the controller may be configured to set the predetermined-ratio-value based on a difference, between the upper-voltage-value and the lower-voltage-value, divided by an input-voltage-value of the input voltage.

In one or more embodiments, the second-input-topology and the second-output-topology may be configured to provide the output voltage such that the output voltage satisfies the predetermined-threshold-voltage-condition.

In one or more embodiments, the predetermined-threshold-voltage-condition may comprise an upper-voltage-value and a lower-voltage-value, and: the output voltage satisfies the predetermined-threshold-voltage-condition if the output voltage is between the upper-voltage-value and the lower-voltage-value; or the output voltage does not satisfy the predetermined-threshold-voltage-condition if the output voltage is not between the upper-voltage-value and the lower-voltage-value.

In one or more embodiments, the controller may be configured to set the predetermined-threshold-voltage-condition in accordance with one or more of: the output voltage; the input voltage; an output current; and a switching frequency.

In one or more embodiments, the predetermined-threshold-voltage-condition may comprise an upper-voltage-value and a lower-voltage-value, and if the output voltage provided by the first-input-topology and the first-output-topology has a first-output-voltage-value that is either: greater than the upper-voltage-value; or less than the lower-voltage-value, then the controller may be configured to set the second-input-topology and the second-output-topology such that the output voltage has a second-output-voltage-value that is between the upper-voltage-value and the lower-voltage-value.

In one or more embodiments, the clock-signal may have a frequency that is between an upper-frequency and a different lower-frequency.

In one or more embodiments, the frequency may have a constant value.

In one or more embodiments, the plurality of capacitors may comprise one or more variable-capacitors, and wherein the controller may be configured to set one or more respective capacitance values of the one or more variable-capacitors based on the output voltage. One or more of the plurality of capacitors may be implemented as a plurality of capacitors that can be selectively connected in parallel with each other, or disconnected from each other, in order to provide a variable capacitance value.

In one or more embodiments, the plurality of capacitors may comprise one or more variable-capacitors, and wherein the controller may be configured to set one or more respective capacitance values of the one or more variable-capacitors based on the output voltage.

In one or more embodiments the switched capacitor power converter may further comprise: a plurality of additional-switches; and one or more additional-capacitors, each additional-capacitor having a first plate and a second plate, wherein the controller may be configured to compare the output voltage with an additional-predetermined-threshold-voltage-condition, and if the output voltage does not satisfy the additional-predetermined-threshold-voltage-condition, then: configure a first-selected-set of the plurality of additional-switches according to a first-additional-input-topology during the first-phase, such that the first plate of each of a first-selected-set of the one or more additional-capacitors is coupled to the voltage input terminal, and the second plate of each of the first-selected-set of the one or more additional-capacitors is coupled to the output terminal; and configure the first-selected-set of the plurality of additional-switches according to a first-additional-output-topology during the second-phase, such that the first plate of each of the first-selected-set of the one or more additional-capacitors is coupled to the voltage output terminal, and the second plate of each of the first-selected-set of the one or more additional-capacitors is coupled to the reference terminal.

In one or more embodiments, the additional-predetermined-threshold-voltage-condition may comprise an additional-upper-voltage-value and additional-lower-voltage-value, and wherein: the additional-upper-voltage-value may be less than or equal to the upper-voltage-value; and/or the additional-lower-voltage-value may be greater than or equal to the lower-voltage-value.

In one or more embodiments, there may be provided an integrated circuit or an electronic device including any switched capacitor power converter of the present disclosure.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying Drawings in which.

A switched capacitor power converter (SCPC) is a circuit comprising a combination of capacitors and switches that can provide a direct current (DC) output voltage that is different to the SCPC's DC input voltage.

Figure 1:
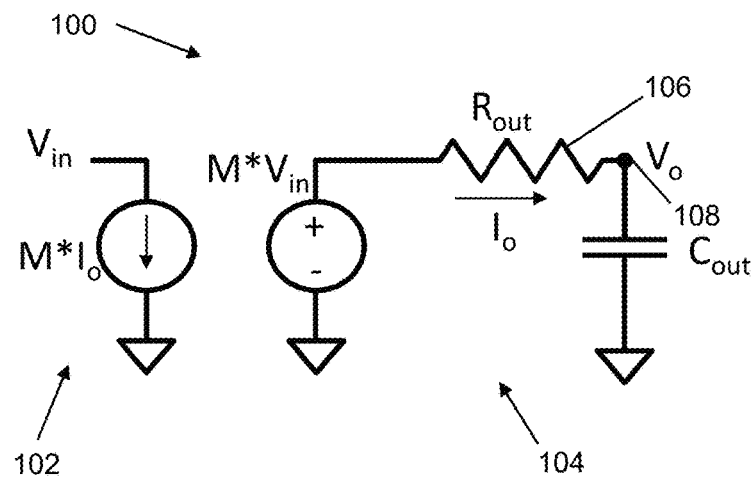
FIG. 1 shows an example of a circuit that is a continuous time equivalent to a switched capacitor power converter.

FIG. 1 shows a voltage controlled voltage source 100. A SCPC can be modelled as an example of the voltage controlled voltage source 100 of FIG. 1. The voltage controlled voltage source 100 has a conversion ratio M. That is, the voltage $V_O$ provided at an output side 104 of the voltage controlled voltage source 100 is M times a voltage $V_{in}$ provided to an input side 102 of the voltage controlled voltage source 100. Generally, the conversion ratio of an SCPC is the ratio of input voltage to output voltage of the SCPC 100. It will be appreciated that the conversion ratio may be greater than or less than one.

The voltage controlled voltage source 100 has an equivalent output impedance 106 ($R_{out}$) which can cause a voltage drop when current is taken from (or injected into) at output node 108. The presence of the equivalent output impedance 106 is a reason why $V_o$ may not be exactly equal to the produce of the conversion ratio with the input voltage ($M*V_{in}$), when an output current ($I_o$) is different than zero.

Figure 2:
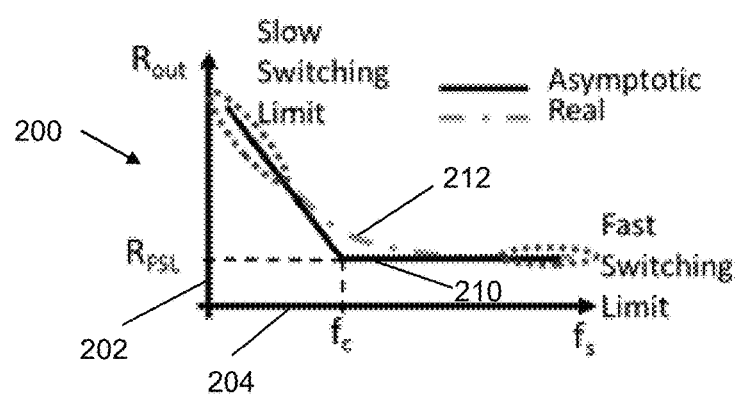
FIG. 2 shows an example of a chart of equivalent output impedance versus switching frequency for a switched capacitor power converter.

FIG. 2 shows an example of a chart 200 that illustrates performance of a SCPC. The chart 200 shows equivalent output impedance, plotted on a vertical axis 202, and switching frequency, plotted on a horizontal axis 204. A solid line 210 depicts idealized asymptotic limits of the performance of a SCPC, while a dashed line 212 shows real performance of a SCPC. Power can be supplied by the SCPC at a range of different output impedances, at a particular output voltage, by varying the switching frequency of the SCPC. The output voltage of a SCPC depends on external parameters such as the input voltage provided to the SCPC and the output current provided by the SCPC to an external load. The output voltage also depends on internal parameters, such as the conversion ratio (M) or the equivalent output impedance ($R_{out}$).

The highest equivalent output impedance ($R_{SSL}$) at which the SCPC can operate corresponds to a slow switching limit of the SCPC. $R_{SSL}$ is a function of both switching frequency ($f_s$) and capacitance (C): $R_{SSL}=f(f_s,C)$. The lowest equivalent output impedance ($R_{FSL}$) at which the SCPC can operate corresponds to a fast switching limit of the SCPC. $R_{FSL}$ is a function of the resistance of the switches when they are "on" ($R_{on}$): $R_{FSL}=f(R_{on})$.

The external parameters may be beyond the control of the designer of a SCPC, but may vary inside the design specification range. In order to provide the output voltage at a desired value, or range of values, it may be possible to adapt the conversion ratio or the output impedance.

In some examples, the conversion ratio can be modified by a feed-forward control system that observes the input voltage and changes the conversion ratio in response to changes in the input voltage. The equivalent output impedance can be modified by tuning the switching frequency. Appropriate tuning of the switching frequency can result in minimization of the switching losses (thus improving the power efficiency of the SCPC). However, an important disadvantage of modifying the switching frequency, is that the spectrum of the generated noise becomes dependent on the input voltage and/or the output current and/or the exact value of the capacitors and/or the on-resistance of the switches ($R_{on}$) because the switching frequency may be varied based on changes in input voltage and/or output current. Variations (inside a particular range) of the input voltage and/or output current are difficult to predict. As a consequence, the switching frequency and therefore the spectrum of the generated switching noise of the SCPC are also difficult to predict. Lack of control over the spectrum of switching noise may result in unwanted interference, which may be particularly problematic when a SCPC is used together with a noise-sensitive system.

Figure 3:
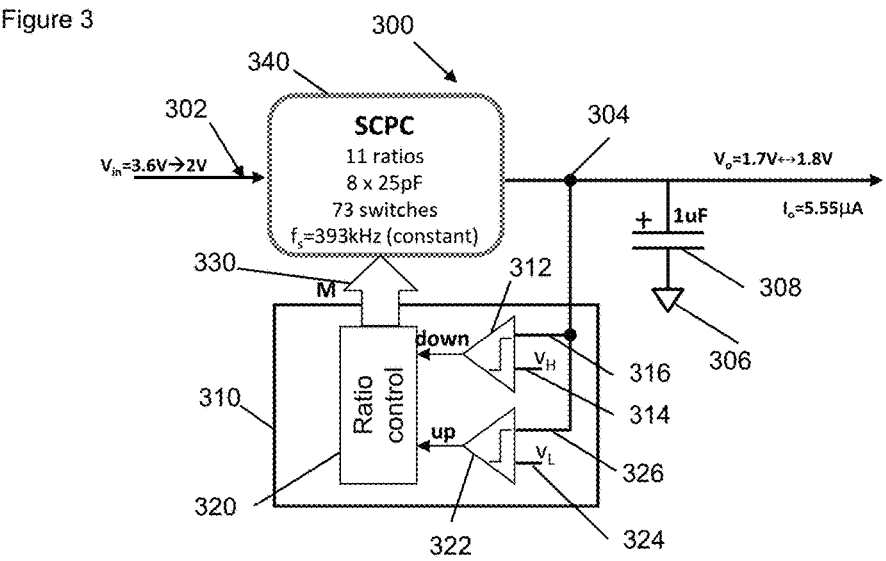
FIG. 3 shows an example embodiment of a schematic diagram of a switched capacitor power converter with closed loop feedback control.

FIG. 3 shows an example embodiment of a SCPC 300, that includes feedback control for setting a conversion ratio (M) of the SCPC 300. Advantageously, this can enable a desired range of output voltages to be provided, for varying input voltages or output current levels, without requiring a change to the switching frequency of the SCPC 300.

The SCPC 300 has a voltage input terminal 302, configured to receive an input voltage, and a voltage output terminal 304, configured to provide an output voltage. In this example, the input voltage can vary between 3.6V and 2V, while the output voltage should be restricted to a value between 1.7V and 1.8V, with an output current of 5.55 µA. The SCPC 300 has a reference terminal 306, which may be a ground terminal, or a floating reference terminal. The SCPC 300 has an optional smoothing capacitor 308 connected between the output terminal 304 and the reference terminal 306.

The SCPC 300 includes eight 25 pF capacitors and 73 switches, which can be configured to provide any one of 11 different conversion ratios. It will be appreciated that SCPCs of the present disclosure may have any number of capacitors and switches. Each capacitor has a first plate and a second plate. Each switch may be either open, and therefore non-conducting, or closed, and therefore conducting. In some examples, the switches may be transistors, for example.

Particular examples of different configurations of capacitors and switches, that provide different conversion ratios, are described below in relation to FIGS. 5 to 7.

Generally, the SCPC 300 can have a plurality of capacitors and a plurality of switches, arranged such that the plurality of switches are configured for selectively connecting the plurality of capacitors to each other, and/or to the voltage input terminal 302, and/or to the voltage output terminal 304. The voltage input terminal 302 is an example of an input terminal and the voltage output terminal 304 is an example of an output terminal.

The SCPC 300 has a controller 310 coupled to the switches and the voltage output terminal 304. In this way, the controller 310 will be able to sense the output voltage, and provide control signals to the switches to selectively connect one or more of the capacitors to provide an output voltage within the desired range of 1.7-1.8V. That is, the controller 310 can control the conversion ratio (M) of the SCPC 300 based on the sensed output voltage.

The controller 310 has a clock-signal-input-terminal (not shown), configured to receive a clock-signal. In some examples the clock-signal may be generated by components within the controller 310, while in other examples the clock signal may be generated externally.

The clock-signal has a first-phase and a second-phase. The first-phase may be considered an input-phase (in that, during this phase, energy can be provided to the capacitors from the voltage input terminal 302). The second-phase may be considered an output-phase (in that, during this phase, energy can be provided from the capacitors to the voltage output terminal 304). The clock-signal is periodic, and consists of a plurality of first-phases interspersed with second-phases. In some examples the clock signal may be a sine wave signal or a square wave signal.

The controller 310 is configured to compare the output voltage with a predetermined-threshold-voltage-condition. In this example, the predetermined-threshold-voltage-condition comprises an upper-voltage-value ($V_H$) and a lower-voltage-value ($V_L$). The controller 310 has an upper comparator 312, configured to receive the upper-voltage-value at a first-high-input-terminal 314 and the output voltage at a second-high-input-terminal 316. If the output voltage is higher than the upper-voltage-value, then the upper comparator 312 sends a high-signal to a ratio control module 320. Similarly, the controller 310 has a lower comparator 322 configured to receive the lower-voltage-value at a first-low-input-terminal 324 and the output voltage at a second-low-input-terminal 326. If the output voltage is lower than the lower-voltage-value, then the lower comparator 322 sends a low-signal to the ratio control module 320. The high-signal can also be described as a down-signal (because it indicates that the conversion ratio is too 'high' and needs to be adjusted 'down'). The low-signal can also be described as an up-signal (because the conversion ratio is too 'low' and needs to be adjusted 'up').

The output voltage may satisfy the predetermined-threshold-voltage-condition if the output voltage is between the upper-voltage-value ($V_H$) and the lower-voltage-value ($V_L$). Conversely, the output voltage does not satisfy the predetermined-threshold-voltage-condition if the output voltage is not between the upper-voltage-value ($V_H$) and the lower-voltage-value ($V_L$).

In some examples, the controller 310 may optionally be configured to set the predetermined-threshold-voltage-condition (such as one or both of $V_H$ and $V_L$) in accordance with one or more of: the output voltage; the input voltage; an output current; and a switching frequency. This may provide advantages whereby a narrower range of output voltages may be provided when the input voltage or output current is low, for example.

When the output voltage satisfies the predetermined-threshold-voltage-condition, because the output voltage is between the upper-voltage-value and the lower-voltage-value, then neither the high-signal nor the low-signal is received at the ratio control module 320. The ratio control module 320 therefore provides control signalling to configure a first-selected-set of the switches according to a first-input-topology during the first-phase, such that the first plate of each of a first-selected-set of capacitors is coupled to the voltage input terminal 302, and the second plate of each of the first-selected-set of capacitors is coupled to the output terminal 304. The ratio control module 320 then provides control signalling to configure the first-selected-set of switches according to a first-output-topology during the second-phase, such that the first plate of each of a first-selected-set of capacitors is coupled to the voltage output terminal 304, and the second plate of each of the first-selected-set of the capacitors is coupled to the reference terminal 306. In this way, the first-selected-set of switches are controlled such that the SCPC 300 maintains a current level for the conversion ratio (M), and the output voltage supplied to the voltage output terminal 304 stays within the desired voltage range.

In this example the ratio control module 320 provides a ratio control signal 330 to a main module 340 that contains the switches and capacitors of the SCRC 300. The ratio control signal 330 is representative of the desired conversion ratio (M). Circuitry within the main module 340 receives the ratio control signal 330 and configures the switches accordingly, by sending switch control signals to the relevant switches. It will be appreciated that in other examples, the ratio control module 320 may provide switch control signals directly to the switches within the main module 340.

Alternatively, when the output voltage does not satisfy the predetermined-threshold-voltage-condition, the ratio control module 320 receives either the high-signal or the low-signal, which indicates that the required conversion ratio, needed to provide the output voltage within the desired range, must be either reduced, or increased, respectively. Therefore, the ratio control module 320 provides control signalling to configure a second-selected-set of the switches according to a second-input-topology during the first-phase, such that the first plate of each of a second-selected-set of the capacitors is coupled to the voltage input terminal 302, and the second plate of each of the second-selected-set of the capacitors is coupled to the output terminal 304. The ratio control module 320 also provides control signalling to configure the second-selected-set of the switches according to a second-output-topology during the second-phase, such that the first plate of each of a second-selected-set of the capacitors is coupled to the voltage output terminal 304, and the second plate of each of the second-selected-set of the capacitors is coupled to the reference terminal 306. Since the first-input-topology is different to the second-input-topology, and the first-output-topology is different to the second-output-topology, the conversion ratio (M) is also different. In this way, the second-selected-set of switches are controlled such that the SCPC 300 applies a higher or lower conversion ratio, such that the output voltage is increased or decreased so that it gets closer to the desired range.

The first-input-topology and first-output-topology together are an example of a first-topology. The second-input-topology and second-output-topology together are an example of a second-topology.

The SCPC 300 uses a clock-signal with a frequency of 393 KHz in this example. Generally, the clock-signal can have a frequency that is between an upper-frequency and a different lower-frequency. When the difference between the upper-frequency and the lower-frequency is sufficiently small, the frequency may be considered to have a constant value.

By applying a constant switching frequency to the SCPC 300, and controlling the conversion ratio by a feedback loop, the SCPC 300 may advantageously have: an output voltage that is within a desired range; and also a well-defined and consistent noise spectrum, which does not significantly interfere with other noise sensitive circuitry.

The possible conversion ratios are a discrete set, because each ratio depends on the topology of the connections of the capacitors, as defined by the switches. Given a finite set of capacitors, the total number of possible topologies will also be finite. In which case, the output voltage cannot be continuously varied such that the output voltage could always be equal to a specific value for any continuously variable input voltage or output current. However, by selecting a suitable topology of capacitor network, the output voltage can be provided inside a defined range. As the output current and/or input voltage changes, the feedback control loop provided by the controller 310, will adjust the conversion ratio of the SCPC 300, in response to changes in the output voltage.

Generally, the first-input-topology and the first-output-topology may together be configured to provide the output voltage at a first-output-voltage-value that is based on a product of a first-ratio-value with the input voltage. Similarly, the second-input-topology and the second-output-topology may together be configured to provide the output voltage at a second-output-voltage-value that is based on a product of a second-ratio-value with the input voltage. In order to provide the output voltage within a desired range, despite variations in input voltage or output current, the first-ratio-value will be different to the second-ratio-value. It will be appreciated here that the output voltages may not be equal to the product of a conversion ratio with an input voltage because of the effect of the equivalent output impedance when current is being taken from (or injected into) the output node, as discussed above in relation to FIG. 1.

If the output voltage provided by the first-input-topology and the first-output-topology has a first-output-voltage-value that is either greater than the upper-voltage-value, or less than the lower-voltage-value, then the controller 310 can set the second-input-topology and the second-output-topology such that the conversion ratio (M) is reduced or increased and the output voltage has a second-output-voltage-value that is between the upper-voltage-value and the lower-voltage-value. Thereby, the second-input-topology and the second-output-topology are configured to provide the output voltage such that the output voltage satisfies the predetermined-threshold-voltage-condition.

In some examples, if a particularly large change suddenly occurs in the input voltage or output current, the output voltage may briefly fail to satisfy the predetermined-threshold-voltage-condition, by assuming a value that is either too high or too low. The controller 310 may then adjust/set a conversion ratio (M) that changes the output voltage to a value that is closer to satisfying the predetermined-threshold-voltage-condition, yet still does not satisfy the predetermined-threshold-voltage-condition, in a first iteration. If the output voltage still fails to satisfy the predetermined-threshold-voltage-condition, then the controller may set a new conversion ratio (M) during the next phase of the clock-signal. The controller may iteratively set a series of conversion ratios in successive phases of the clock-signal until the output voltage satisfies the predetermined-threshold-voltage-condition.

In this example, the SCPC 300 has eleven different conversion ratios: 1/2, 5/9, 4/7, 3/5, 5/8, 2/3, 5/7, 3/4, 7/9, 4/5 and 1. However, it will be appreciated that SCPCs according to the present disclosure may have a plurality of different conversion ratios of any number.

Due the discrete change in values of the conversion ratio, it is possible that after a conversion ratio is changed, the new conversion ratio is too big (or too small), and that consequently the output voltage has overshot the desired range for the output voltage. Such a situation could result in the output voltage bouncing between the limits of the desired voltage range for a given output current.

Undesirable switching between different conversion ratios may be avoided by requiring that the second-input-topology and the second-output-topology are selected such that a difference between the conversion ratio of the first-input-topology and the first-output-topology (a first-ratio-value) and the (adjacent) conversion ratio of the second-input-topology and the second-output-topology (a second-ratio-value) is less than a predetermined-ratio-value.

In some examples, the predetermined-ratio-value may be a fixed constant value. However, in other examples, the controller 310 may be configured to set the predetermined-ratio-value based on one or more of: the predetermined-threshold-voltage-condition; and the input voltage. If the predetermined-threshold-voltage-condition relates to a large range of acceptable voltages, or if the input voltage is smaller, then allowable changes in conversion ratio may also be larger.

In some examples, since the output voltage can be approximately equal to the product of the input voltage and the conversion ratio, for the same proportional jump in conversion ratio, a higher input voltage can result in a larger change of output voltage. Thus, the higher the input voltage the smaller the acceptable change (or jump) in conversion ratio may be. Similarly, a lower input voltage can allow a larger jump between different conversion ratios, because the resulting change in output voltage will be smaller given the lower input voltage value.

Wherein the predetermined-threshold-voltage-condition comprises an upper-voltage-value and a lower-voltage-value, the controller 310 may be configured to set the predetermined-ratio-value based on one or both of the upper-voltage-value and the lower-voltage-value.

In some examples, the controller 310 may be configured to set the predetermined-ratio-value based on a difference, between the upper-voltage-value and the lower-voltage-value, divided by an input-voltage-value of the input voltage. In this way, consecutive conversion ratios can be limited to changes of conversion ratio value that are within safe limits.

In other examples, the controller 310 may be configured to set one or both of the upper-voltage-value and the lower-voltage-value based on a difference between two available conversion ratios. In this way, if a range of input voltages and the desired output voltage are such that two or more topologies with conversion ratios that are close together may be used to provide the output voltage, the upper-voltage-value and the lower-voltage-value may be set close together. Conversely, if the available topologies relevant to providing a desired output voltage for a given range of input voltage are far apart, then the upper-voltage-value and the lower-voltage-value may also be set to be relatively far apart.

Avoiding the possibility that the output voltage may bounce between the two limits of the output voltage range can be important to avoid reducing the power efficiency of the SCPC. Such reductions in power efficiency may occur due to the changes of conversion ratios. Preventing output voltage bounces can also prevent the generation of low frequency variations of the output voltage. Such low frequency variations may be determined by the dynamics corresponding to an equivalent RC circuit at the output of the SCPC 300.

Figure 4:
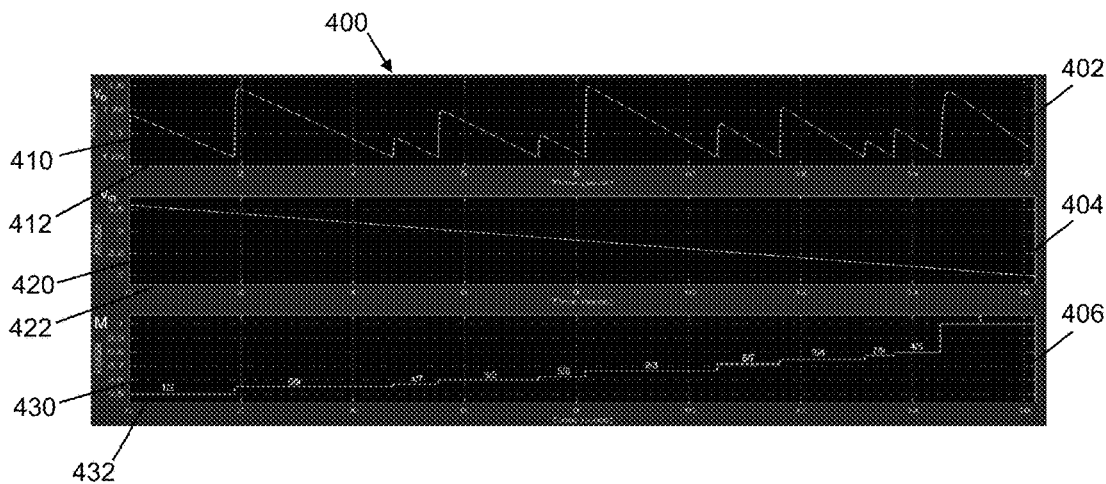
FIG. 4 shows an example embodiment of a chart showing input voltage, output voltage and conversion ratio for the switched capacitor power converter of FIG. 3.

FIG. 4 shows a chart 400 that contains performance data for the SCPC shown in FIG. 3. A first sub-chart 402 shows output voltage (on a vertical axis 410) as a function of time (on a horizontal axis 412). A second sub-chart 404 shows input voltage (on a vertical axis 420) as a function of time (on a horizontal axis 422). A third sub-chart 406 shows conversion ratio (on a vertical axis 430) as a function of time (on a horizontal axis 432). The time axes 412, 422, 432 are aligned such that they relate to the same period of time.

In this example the output current was constant, and the input voltage was decreased from 3.6V down to 2V over a period of 16 seconds, as shown in the second sub-chart 404. The control loop used by the SCPC was able to keep the output voltage inside the range 1.7V to 1.8V (as shown in the second sub-chart 402), by modifying the conversion ratio of the SCPC (as shown in the third sub-chart 404). As shown in FIG. 4, each time the output voltage (in the first sub-chart 402) drops to 1.7V, the conversion ratio (shown in the third sub-chart 406) is increased, which in turn causes the output voltage to increase to a level that is less than 1.8V. For each conversion ratio the output voltage ramps linearly in proportion to changes in input voltage. However, with a sufficient number of different conversion ratios to choose from, the output voltage can advantageously be provided within the acceptable desired range.

Figure 5:
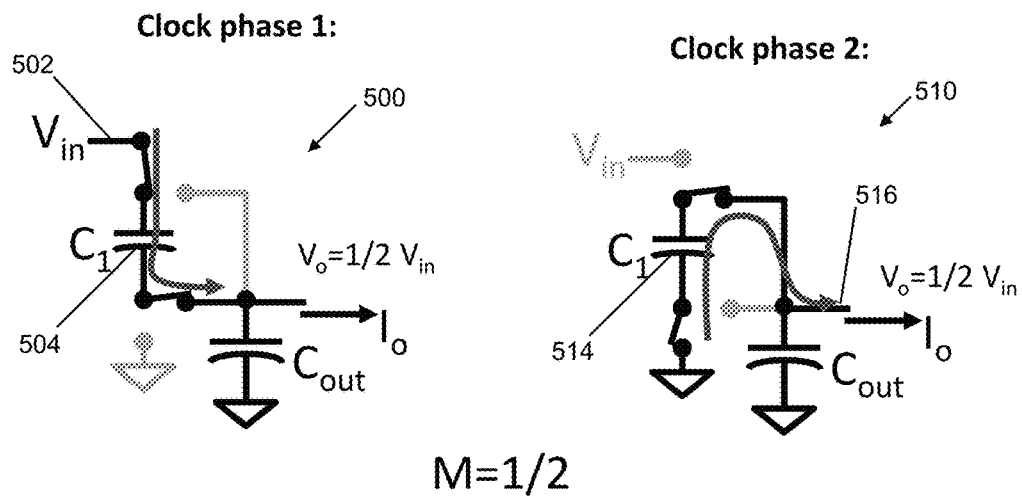
FIG. 5 shows a first example embodiment of a switched capacitor power converter in a first switching phase and in a second switching phase.
Figure 6:
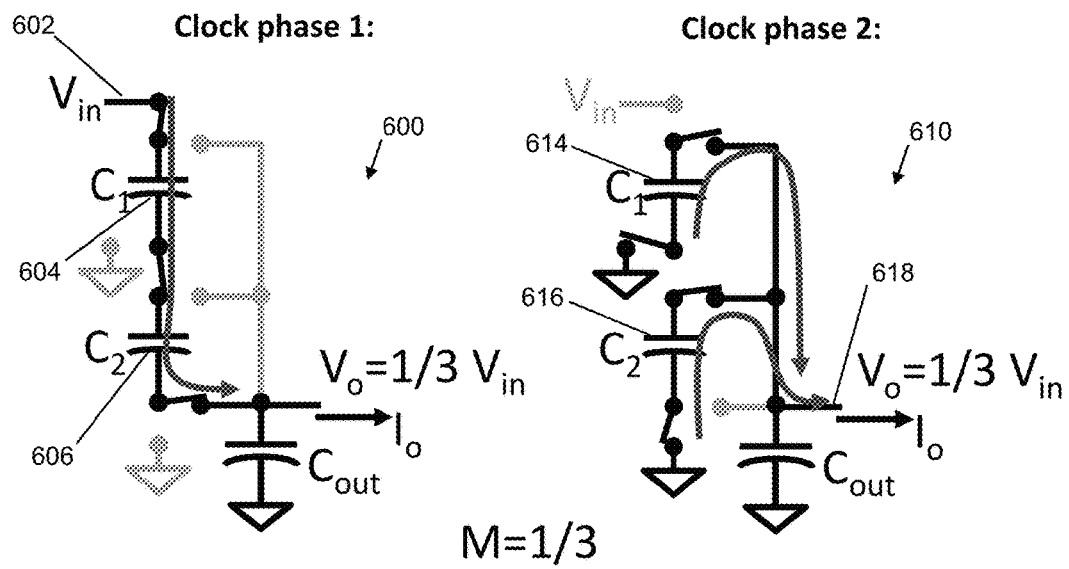
FIG. 6 shows a second example embodiment of a switched capacitor power converter in a first switching phase and in a second switching phase.
Figure 7:
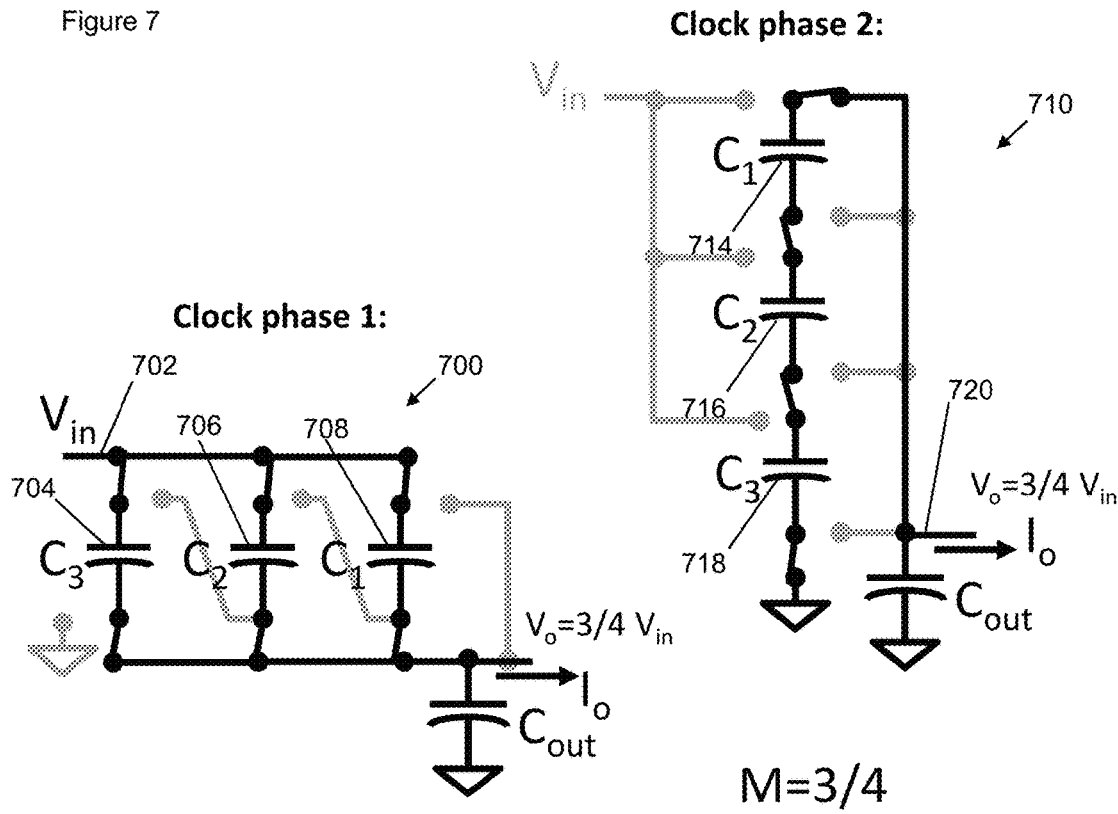
FIG. 7 shows a third example embodiment of a switched capacitor power converter in a first switching phase and in a second switching phase.

FIGS. 5, 6 and 7 show different examples of switched-capacitor power converter topologies that have different conversion ratios. Each of these capacitor topologies can be provided by a single circuit that has a suitable plurality of capacitors and switches, if the switches are operated appropriately. That is, the same capacitors can be used to provide the different topologies. Capacitors and switches that are not used in a particular topology are not shown in these figures to improve the clarity of the disclosure.

FIG. 5 shows an example of a first-input-topology 500, in which energy is provided from an input terminal 502 to a first capacitor 504, during a first-phase. FIG. 5 also shows a first-output-topology 510, in which energy is provided from the first capacitor 514 to an output terminal 516. The first-input-topology 500, and first-output-topology 510, when operated at a constant switching frequency, provides an output voltage that is one half of the input voltage, if no output current is taken (or injected), strictly speaking. Otherwise there will be a voltage drop (or increase) due to the output impedance and current. That is, a selected set of switches has been operated such that the conversion ratio is 1/2.

FIG. 6 shows an example of a second-input-topology 600, in which energy is provided from an input terminal 602 to a first capacitor 604 and a second capacitor 606, during a first-phase. FIG. 6 also shows a second-output-topology 610, in which energy is provided from the first capacitor 614 and the second capacitor 616 to an output terminal 618. The second-input-topology 600 and second-output-topology

610, when operated at a constant switching frequency, provides an output voltage that is one third of the input voltage, if no output current is taken (or injected), strictly speaking. Otherwise there will be a voltage drop (or increase) due to the output impedance and current. That is, a selected set of switches has been operated such that the conversion ratio is 1/3.

FIG. 7 shows an example of a third-input-topology 700, in which energy is provided from an input terminal 702 to a first capacitor 704, a second capacitor 706 and a third capacitor 708, during a first-phase. FIG. 7 also shows a third-output-topology 710, in which energy is provided from the first capacitor 714, the second capacitor 716 and the third capacitor 718 to an output terminal 720. The third-input-topology 700 and third-output-topology 710, when operated at a constant switching frequency, provides an output voltage that is three quarters of the input voltage, if no output current is taken (or injected), strictly speaking. Otherwise there will be a voltage drop (or increase) due to the output impedance and current. That is, a selected set of switches has been operated such that the conversion ratio is 3/4.

Figure 8:
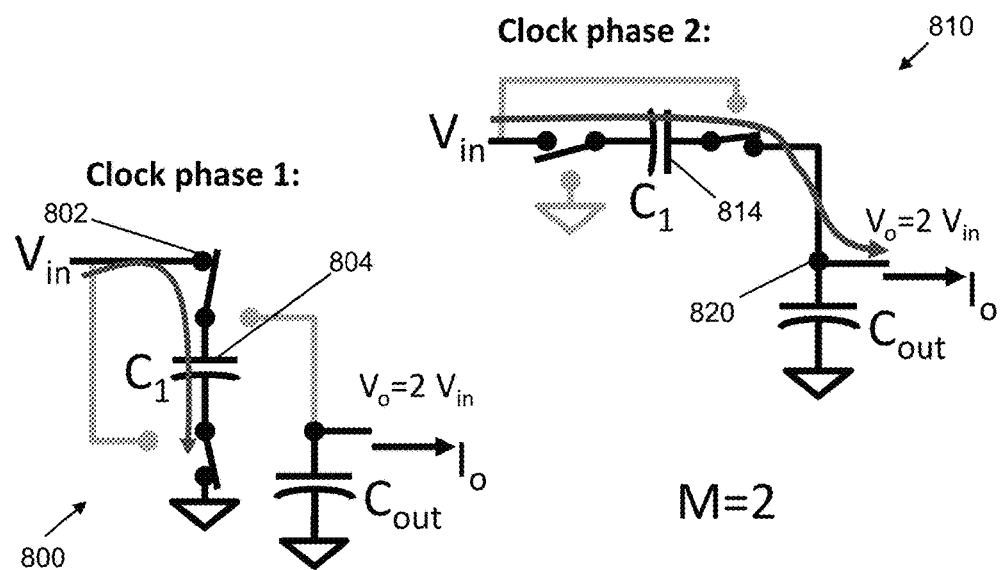
FIG. 8 shows a fourth example embodiment of a switched capacitor power converter in a first switching phase and in a second switching phase.

FIG. 8 shows an example of a fourth-input-topology 800, in which energy is provided from an input terminal 802 to a first capacitor 804 during a first-phase. FIG. 8 also shows a fourth-output-topology 810, in which energy is provided from the first capacitor 814 to an output terminal 820 during a second phase. The fourth-input-topology 800 and fourth-output-topology 810, when operated at a constant switching frequency, provide an output voltage that is twice the input voltage, if no output current is taken (or injected), strictly speaking. Otherwise there will be a voltage drop (or increase) due to the output impedance and current. That is, a selected set of switches has been operated such that the conversion ratio is 2.

Figure 9:
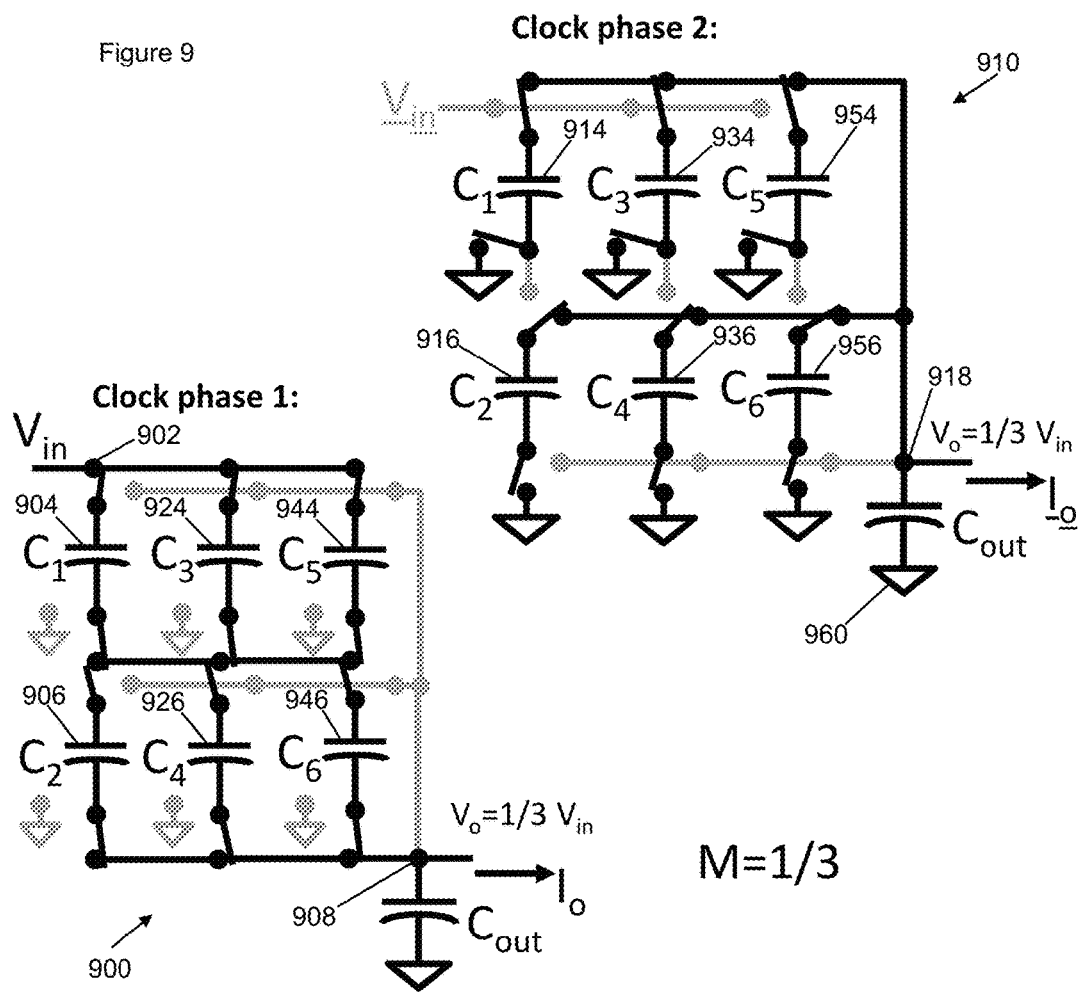
FIG. 9 shows an example embodiment of a switched capacitor power converter with switchable floating capacitors.

FIG. 9 shows an example a SCPC with optional switchable floating capacitors. Features of FIG. 9 that are similar to features of FIG. 6 have been given similar reference numerals and may not necessarily be described further here.

The SCPC has a third capacitor 924, 934 and a fifth capacitor 944, 954 connected in parallel with a first capacitor 904, 914. The SCPC also has a fourth capacitor 926, 936 and a sixth capacitor 946, 956 connected in parallel with a second capacitor 906, 916. The third capacitor 924, 934, fourth capacitor 926, 936, fifth capacitor 944, 954 and sixth capacitor 946, 956 are each examples of an additional-capacitor.

The SCPC has a first-input-topology 900 and first-output-topology 910, which when operated at a constant switching frequency, provide an output voltage that is one third of the input voltage, if no output current is taken (or injected). Thereby, for zero output current, the SCPC 900 functions in the same way as the SCPC shown in FIG. 6, i.e. with a conversion ratio of M=1/3.

However, for circuits such as the SCPC of FIG. 9, a controller (not shown) may choose which (and how many) capacitors are connected in the first and second phases, thereby different values of output impedance can be obtained, with the same conversion ratio. This is an example of how output impedance can be modulated in discrete values (for the same conversion ratio) to add finer granularity to the settings of the SCPC and thereby tune the output voltage to values within a desired range for variable input voltages.

To achieve this finer granularity, the SCPC has a plurality of additional-switches. The controller compares the output voltage with an additional-predetermined-threshold-voltage-condition. The additional-predetermined-threshold-voltage-condition may be the same as the predetermined-threshold-voltage-condition discussed above, or may relate to a narrower, more restricted, range of voltages. In this latter case, the additional-predetermined-threshold-voltage-condition can have an additional-upper-voltage-value and additional-lower-voltage-value. The additional-upper-voltage-value can be less than the upper-voltage-value. The additional-lower-voltage-value can be greater than the lower-voltage-value.

If the output voltage does not satisfy the additional-predetermined-threshold-voltage-condition, such as when the output voltage is either greater than the additional-upper-voltage-value or less than the additional-lower-voltage-value, then the controller may configure some or all of the plurality of additional switches.

For example, the controller can configure a first-selected-set of the plurality of additional-switches according to a first-additional-input-topology 900 during the first-phase, such that the first plate of each of a first-selected-set of the one or more additional-capacitors 924, 944, 926, 946 is coupled to the voltage input terminal 902, and the second plate of each of the first-selected-set of the one or more additional-capacitors 924, 944, 926, 946 is coupled to the output terminal 908. In this example, there are four additional-capacitors 924, 944, 926, 946, however, it will be appreciated that any number greater than or less than four may be used.

The controller can configure the first-selected-set of the plurality of additional-switches according to a first-additional-output-topology 910 during the second-phase, such that the first plate of each of the first-selected-set of the one or more additional-capacitors 934, 936, 954, 956 is coupled to the voltage output terminal 908, and the second plate of each of the first-selected-set of the one or more additional-capacitors 934, 936, 954, 956 is coupled to the reference terminal 960.

In this way, by altering both a combination of conversion ratio and floating capacitance value, it is possible, in effect to provide more "gears" or set positions for a SCPC, which can result in a finer control of the output voltage.

Figure 10:
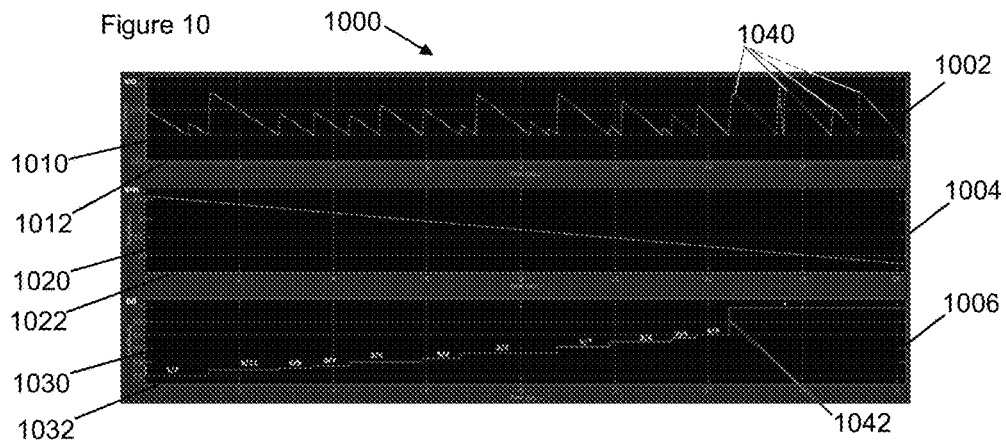
FIG. 10 shows an example embodiment of a chart showing input voltage, output voltage and conversion ratio for the switched capacitor power converter of FIG. 9, where output impedance is modulated via floating capacitance modulation.

FIG. 10 shows a chart 1000 that contains performance data for the SCPC shown in FIG. 9. Features of FIG. 10 that are similar to features of FIG. 4 have been given similar reference numerals and may not necessarily be discussed further here.

A portion of the first chart 1002 on the right hand side relates to conversion ratios of one, as shown in the corresponding portion 1042 of the third chart 1006. However, in this case a plurality of discrete voltage changes 1040 are shown in the output voltage. These changes 1040 are enabled by selective switching of a different number of additional-capacitors in the same topology. This advantageously extends the range of input voltages that can be used to provide the output voltage within the desired range. Alternatively, the additional-capacitors can be used to provide an output voltage within a narrower, more precise, range of output voltages.

In some examples (not shown) an SCPC can have a plurality of capacitors including one or more variable-capacitors, and the controller can be configured to set one or more respective capacitance values of the one or more variable-capacitors based on the output voltage. Such an arrangement may enable continuous changes in the capacitance value, rather than discrete changes, such as are possible with the circuit discussed above in relation to FIGS. 9 and 10. In some examples, varactors may be used to provide such variable capacitors. In such cases an SCPC controller may configure the varactors to have desired capacitance values based on the output voltage of the SCPC. Tuning the capacitance values, in combination with changing the topology of the capacitance network may enable a SCPC to provide an output voltage within an advantageously narrow desired range for a broad range of input voltages.

It will be appreciated that a SCPC according to the present disclosure may be provided as an integrated circuit or may be provided as a component of an electronic device.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A switched capacitor power converter comprising:
   an input terminal;
   an output terminal;
   a plurality of capacitors;
   a plurality of switches for selectively connecting the plurality of capacitors to each other, and/or to the input terminal, and/or to the output terminal, and/or a reference terminal; and
   a controller configured to operate the plurality of switches based on an output voltage at the output terminal, such that one or more of the plurality capacitors are connected between the input terminal and the output terminal as either:
     a first-topology, to provide a first conversion ratio; or
     a second-topology, to provide a second conversion ratio or a third conversion ratio, wherein the first conversion ratio, the second conversion ratio and the third conversion ratio are different from each other,
   wherein the controller includes an clock input terminal to receive a clock signal, the clock signal having a first phase and a second phase, wherein the controller is configured to select a first plurality of switches in the first phase and a second plurality of switches in the second phase, wherein the second plurality of switches is different from the first plurality of switches, wherein the controller includes a first comparator to compare the output voltage with a first threshold and a second comparator to compare the output voltage with a second threshold, wherein the controller is configured to provide the first conversion ratio when the output voltage is between the first threshold and the second threshold, the second conversion ratio when the output voltage is higher than the first threshold and the third conversion ratio when the output voltage is lower than the second threshold, wherein the second conversion ratio is selected only if a difference between the first conversion ratio and the second conversion ratio is less than a preselected value, wherein the preselected value is determined by the controller based at least on a voltage at the input terminal.

2. The switched capacitor power converter of claim 1, wherein the controller is configured to operate the plurality of switches based on a comparison between the output voltage and a predetermined-threshold-voltage-condition.

3. The switched capacitor power converter of claim 1, further comprising:
   a reference terminal;
   wherein:
     the input terminal is configured to receive an input voltage;
     the output terminal is configured to provide an output voltage;
     each of the plurality of capacitors comprises a first plate and a second plate;
     the controller is coupled to:
       the plurality of switches; and
       the voltage output terminal,
     wherein the controller comprises a clock-signal-input-terminal, configured to receive a clock-signal, having a first-phase and a second-phase,
     wherein, the controller is configured to compare the output voltage with a predetermined-threshold-voltage-condition, and:

if the output voltage satisfies the predetermined-threshold-voltage-condition, then:
configure a first-selected-set of the plurality of switches according to a first-input-topology during the first-phase, such that the first plate of each of a first-selected-set of the plurality of capacitors is coupled to the voltage input terminal, and the second plate of each of the first-selected-set of the plurality of capacitors is coupled to the output terminal; and
configure the first-selected-set of the plurality of switches according to a first-output-topology during the second-phase, such that the first plate of each of a first-selected-set of the plurality of capacitors is coupled to the voltage output terminal, and the second plate of each of the first-selected-set of the plurality of capacitors is coupled to the reference terminal, or
if the output voltage does not satisfy the predetermined-threshold-voltage-condition, then:
configure a second-selected-set of the plurality of switches according to a second-input-topology during the first-phase, such that the first plate of each of a second-selected-set of the plurality of capacitors is coupled to the voltage input terminal, and the second plate of each of the second-selected-set of the plurality of capacitors is coupled to the output terminal; and
configure the second-selected-set of the plurality of switches according to a second-output-topology during the second-phase, such that the first plate of each of a second-selected-set of the plurality of capacitors is coupled to the voltage output terminal, and the second plate of each of the second-selected-set of the plurality of capacitors is coupled to the reference terminal,
wherein, the first-input-topology is different to the second-input-topology, and the first-output-topology is different to the second-output-topology.

4. The switched capacitor power converter of claim 3, wherein:
the first-input-topology and the first-output-topology are configured to provide the output voltage at a first-output-voltage-value that is based on a product of a first-ratio-value with the input voltage; and
the second-input-topology and the second-output-topology are configured to provide the output voltage at a second-output-voltage-value that is based on a product of a second-ratio-value with the input voltage,
wherein the first-ratio-value is different to the second-ratio-value.

5. The switched capacitor power converter of claim 4, wherein the second-input-topology and the second-output-topology are selected such that a difference between the first-ratio-value and the second-ratio-value is less than a predetermined-ratio-value.

6. The switched capacitor power converter of claim 5, wherein the controller is configured to set the predetermined-ratio-value based on one or more of:
the predetermined-threshold-voltage-condition; and
the input voltage.

7. The switched capacitor power converter of claim 6, wherein:
the predetermined-threshold-voltage-condition comprises an upper-voltage-value and a lower-voltage-value; and
the controller is configured to set the predetermined-ratio-value based on the upper-voltage-value and the lower-voltage-value.

8. The switched capacitor power converter of claim 7, wherein the controller is configured to set the predetermined-ratio-value based on a difference, between the upper-voltage-value and the lower-voltage-value, divided by an input-voltage-value of the input voltage.

9. The switched capacitor power converter of claim 3, wherein the second-input-topology and the second-output-topology are configured to provide the output voltage such that the output voltage satisfies the predetermined-threshold-voltage-condition.

10. The switched capacitor power converter of claim 3, wherein the predetermined-threshold-voltage-condition comprises an upper-voltage-value and a lower-voltage-value, and:
the output voltage satisfies the predetermined-threshold-voltage-condition if the output voltage is between the upper-voltage-value and the lower-voltage-value; or
the output voltage does not satisfy the predetermined-threshold-voltage-condition if the output voltage is not between the upper-voltage-value and the lower-voltage-value.

11. The switched capacitor power converter of claim 3, wherein the controller is configured to set the predetermined-threshold-voltage-condition in accordance with one or more of: the output voltage; the input voltage; and an output current.

12. The switched capacitor power converter of claim 3, wherein the predetermined-threshold-voltage-condition comprises an upper-voltage-value and a lower-voltage-value, and if the output voltage provided by the first-input-topology and the first-output-topology has a first-output-voltage-value that is either:
greater than the upper-voltage-value; or
less than the lower-voltage-value,
then the controller is configured to set the second-input-topology and the second-output-topology such that the output voltage has a second-output-voltage-value that is between the upper-voltage-value and the lower-voltage-value.

13. The switched capacitor power converter of claim 3, wherein the frequency has a constant value.

14. The switched capacitor power converter of claim 3, further comprising:
a plurality of additional-switches; and
one or more additional-capacitors, each additional-capacitor having a first plate and a second plate,
wherein the controller is configured to compare the output voltage with an additional-predetermined-threshold-voltage-condition, and if the output voltage does not satisfy the additional-predetermined-threshold-voltage-condition, then:
configure a first-selected-set of the plurality of additional-switches according to a first-additional-input-topology during the first-phase, such that the first plate of each of a first-selected-set of the one or more additional-capacitors is coupled to the voltage input terminal, and the second plate of each of the first-selected-set of the one or more additional-capacitors is coupled to the output terminal; and
configure the first-selected-set of the plurality of additional-switches according to a first-additional-output-topology during the second-phase, such that the first plate of each of the first-selected-set of the one or more additional-capacitors is coupled to the voltage output terminal, and the second plate of each of the first-selected-set of the one or more additional-capacitors is coupled to the reference terminal.

15. The switched capacitor power converter of claim 14, wherein the additional-predetermined-threshold-voltage-condition comprises an additional-upper-voltage-value and additional-lower-voltage-value, and wherein:
   the additional-upper-voltage-value is less than or equal to the upper-voltage-value; and/or
   the additional-lower-voltage-value is greater than or equal to the lower-voltage-value.

* * * * *